Inventor
Richard Herrmann
Atty.

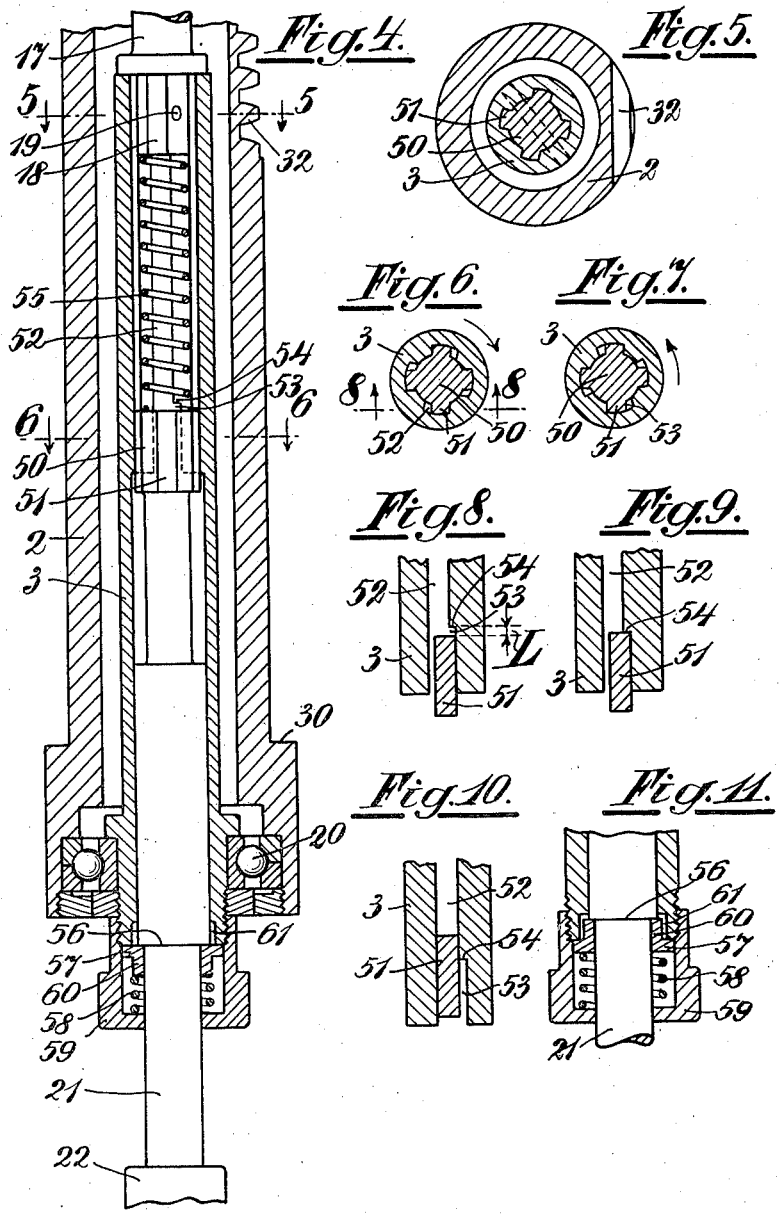

March 23, 1937. R. HERRMANN 2,074,470
SCREW CUTTING MACHINE
Filed June 26, 1936   6 Sheets-Sheet 4
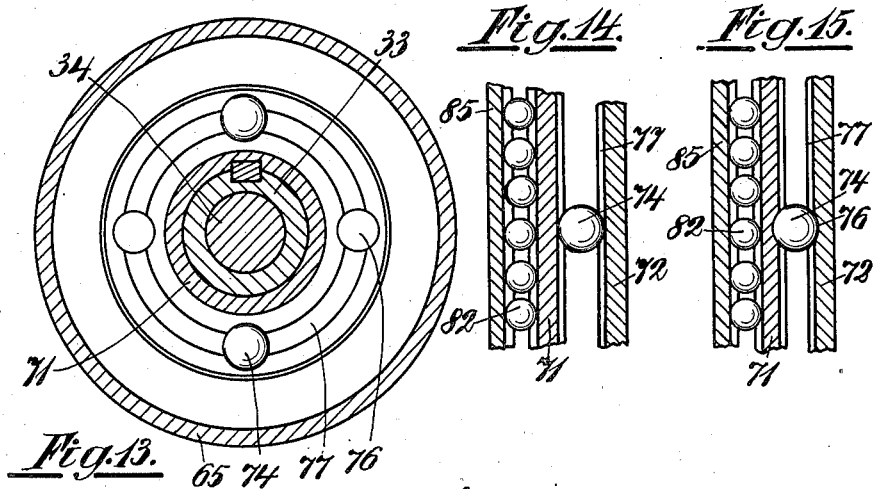
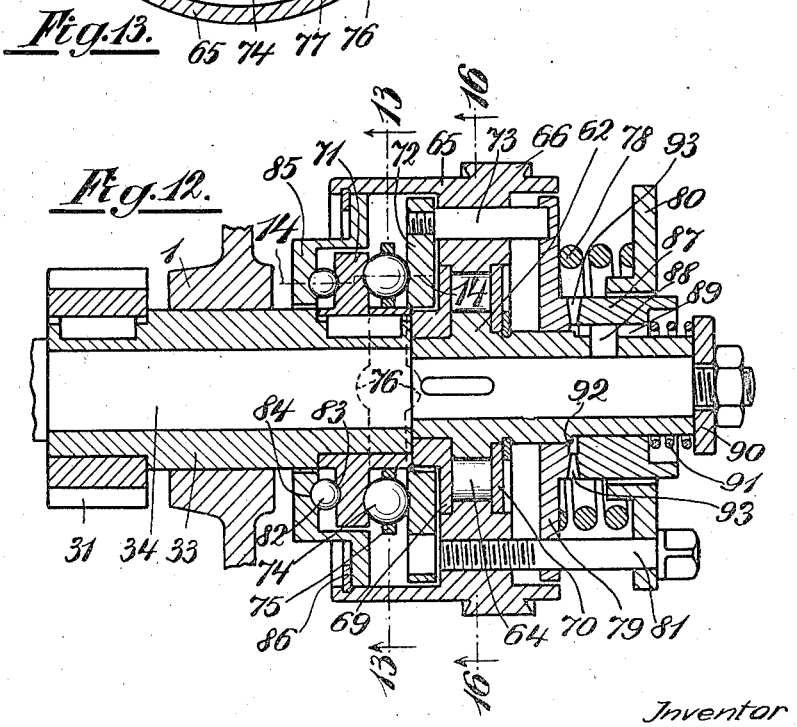
Inventor
Richard Herrmann
by Karl Lichmair
Atty.

March 23, 1937.  R. HERRMANN  2,074,470
SCREW CUTTING MACHINE
Filed June 26, 1936   6 Sheets-Sheet 5
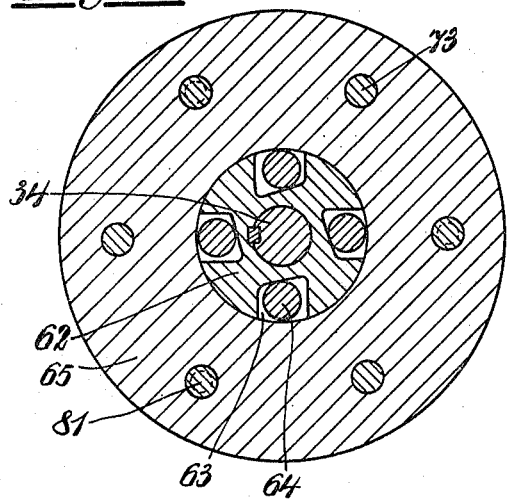
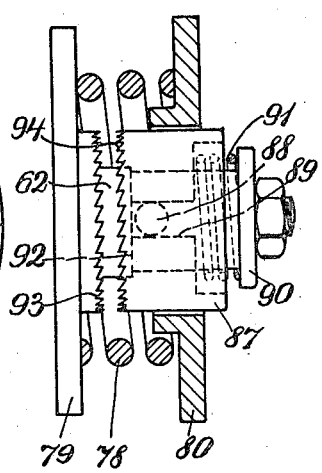
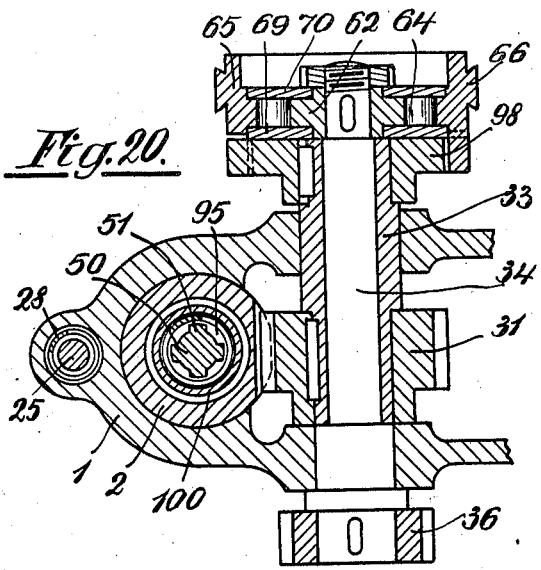
Inventor
Richard Herrmann
by Karl Lichauer
Atty.

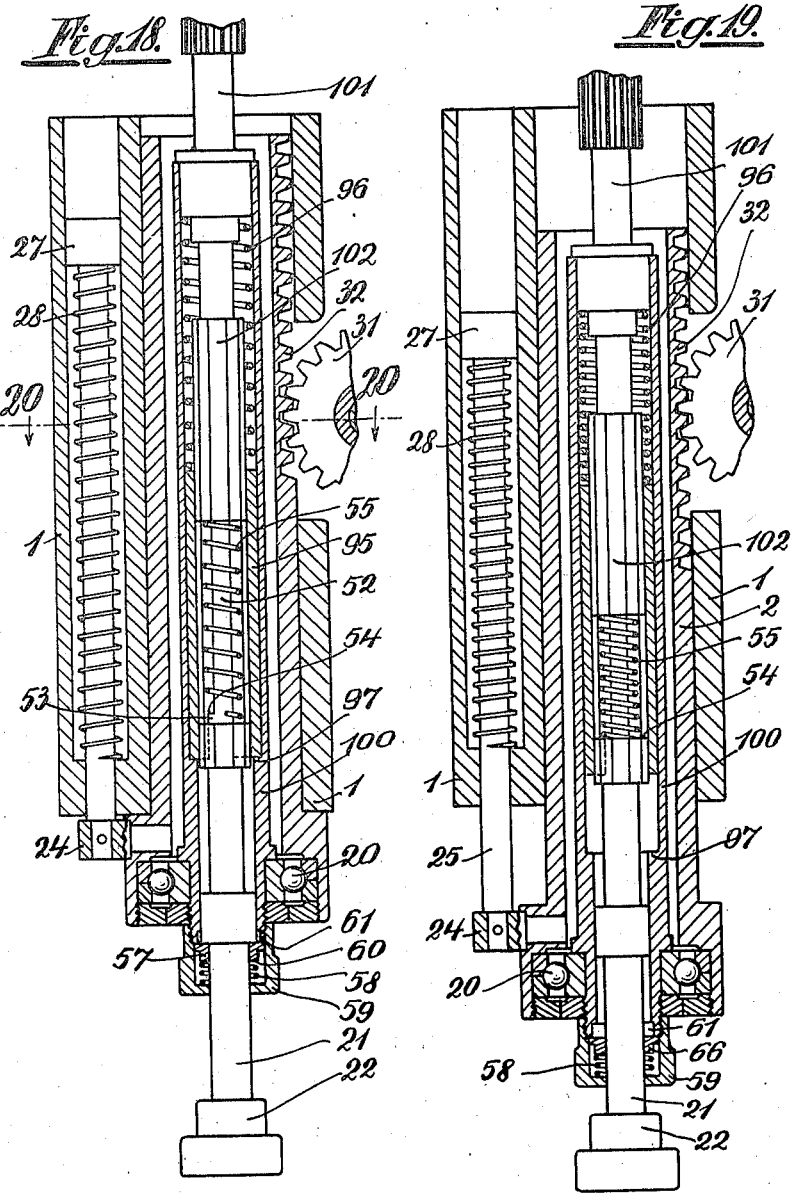

Patented Mar. 23, 1937

2,074,470

UNITED STATES PATENT OFFICE 2,074,470

SCREW CUTTING MACHINE

Richard Herrmann, Stuttgart, Germany

Application June 26, 1936, Serial No. 87,493
In Germany February 27, 1936

11 Claims. (Cl. 10—105)

My invention relates to screw cutting machines and more especially to a screw cutting machine the feed spindle of which is, alternately, fed and simultaneously caused to rotate in one direction and returned and simultaneously caused to rotate in the other direction.

In order to compensate any difference between the feed of the feed spindle and the pitch of the screw cutting tool, a buffer spring is arranged in the feed gear of the known machines of this kind or the spindle is fed by means of a spring having an initial tension corresponding to the counter-pressure occurring in the very beginning of the cutting, while the feed is limited by a gear to a predetermined maximum value.

These known arrangements involve the considerable drawback that the initial tension of the compensating springs in the feed device must in any case exceed a certain minimum value in order to secure that the electrically or mechanically operated reversing gear is actuated. Another drawback consists therein that a friction clutch coupling must be arranged in connection with the feed device, because the longitudinal return motion of the feed spindle, i. e. in a vertical machine the motion in the upward direction, is limited and the feed spindle does not cease to rotate and comes to a rest only after a certain period of time, during which the friction clutch coupling is required to slip. As the friction of such couplings after a certain time of operation is as a rule considerably increased, the feed gear will be easily spoiled.

It is an object of my invention to avoid these drawbacks. To this end I design these machines and more particularly their feed device in a novel manner.

In a machine according to my invention the feed spindle is made in several parts. In the casing of the machine a bushing is provided for longitudinal motion; it is positively guided for motion in the working direction, i. e. in the direction towards the screw tap of the machine. A preferably hollow spindle, acting as feed spindle proper, is placed in this bushing for free rotation in both directions, but is joined to the bushing for joint longitudinal motion. This spindle guides, preferably in its interior if hollow, another spindle which is adapted to accommodate on its outer end a chuck for a screw tap. This chuck-spindle is arranged for joint rotation with the feed spindle first mentioned, but is free to move longitudinally in the same. The connection between the chuck-spindle and the feed spindle may be established by means of one or more longitudinally extending grooves in the wall of the feed spindle, capable of receiving one or more corresponding projections of the chuck-spindle. On one side these grooves may be enlarged at the end turned towards the chuck; the shoulders formed thereby are adapted to sustain the back ends of the projections of the chuck-spindle which is secured in this manner against longitudinal displacement during the feed motion and more especially during the cutting operation. Resilient means are arranged to press or draw, in the starting position of the machine, the chuck-spindle with its projections into the enlargements of the grooves. The shoulders and the back ends of the projections are so shaped that the projections slide from the shoulders, when the rotation of the feed spindle reverses for return motion, so that the chuck-spindle is then substantially free for longitudinal motion in relation to the feed spindle.

I may further arrange resilient means of suitable tension capable of uncoupling the bushing and the driving means when the feed motion should require more power than occurs in the cutting action desired, for instance when the screw tap meets a work-piece without a suitable hole. Alternatively a sleeve may be arranged for the same purpose between the feed spindle and the chuck-spindle and equipped with the grooves mentioned above; this sleeve is free for longitudinal motion relative to the feed spindle and may be pressed by a strong spring towards a stop limiting its longitudinal motion in the direction towards the screw tap. I may furthermore provide resilient means which guide the bushing into the starting position remote from the work-piece as soon as the bushing is uncoupled from the driving means.

Further objects of my invention will appear from the following description.

In the drawings affixed to this specification and forming part thereof some embodiments of my invention are shown diagrammatically by way of example. In the drawings Fig. 1 is a vertical sectional view of a vertical screw cutting machine according to my invention, while Fig. 2 is a cross section on the line 2—2 in Fig. 1;

Fig. 4 is a vertical sectional view of the feed spindle, drawn to a larger scale;

Fig. 5 is a cross sectional view on the line 5—5 in Fig. 4;

Fig. 6 is a similar view, on the line 6—6 of Fig. 4, of the machine while being in feed motion;

Fig. 7 is a similar view, on the line 6—6 of Fig. 4, of the machine while being in return motion;

Fig. 8 is a tangential section on the line 8—8 of Fig. 6, while the machine is at rest;

Fig. 9 is a view similar to Fig. 8 while the feed spindle is in feed motion;

Fig. 10 is a view similar to Fig. 8 while the feed spindle is in return motion;

Fig. 11 is a partial view according to Fig. 4 showing another adjustment of the stop ring limiting the feed motion of the feed spindle.

Fig. 12 is a sectional view, drawn to a larger scale, of the feed device with the balls disengaged and the auxiliary coupling engaged;

Fig. 13 is a partial cross section of the feed device on the line 13—13 in Fig. 12;

Fig. 14 is a horizontal sectional view on the line 14—14 in Fig. 12;

Fig. 15 is a similar view with the balls disengaged;

Fig. 16 is a cross section on the line 16—16 in Fig. 12;

Fig. 17 is a front elevation, partly in section, of the auxiliary coupling;

Fig. 18 is a vertical sectional view of another modification of the feed spindle;

Fig. 19 shows the feed spindle in another position;

Fig. 20 is a cross section on the line 20—20 in Fig. 18.

Figure 1:
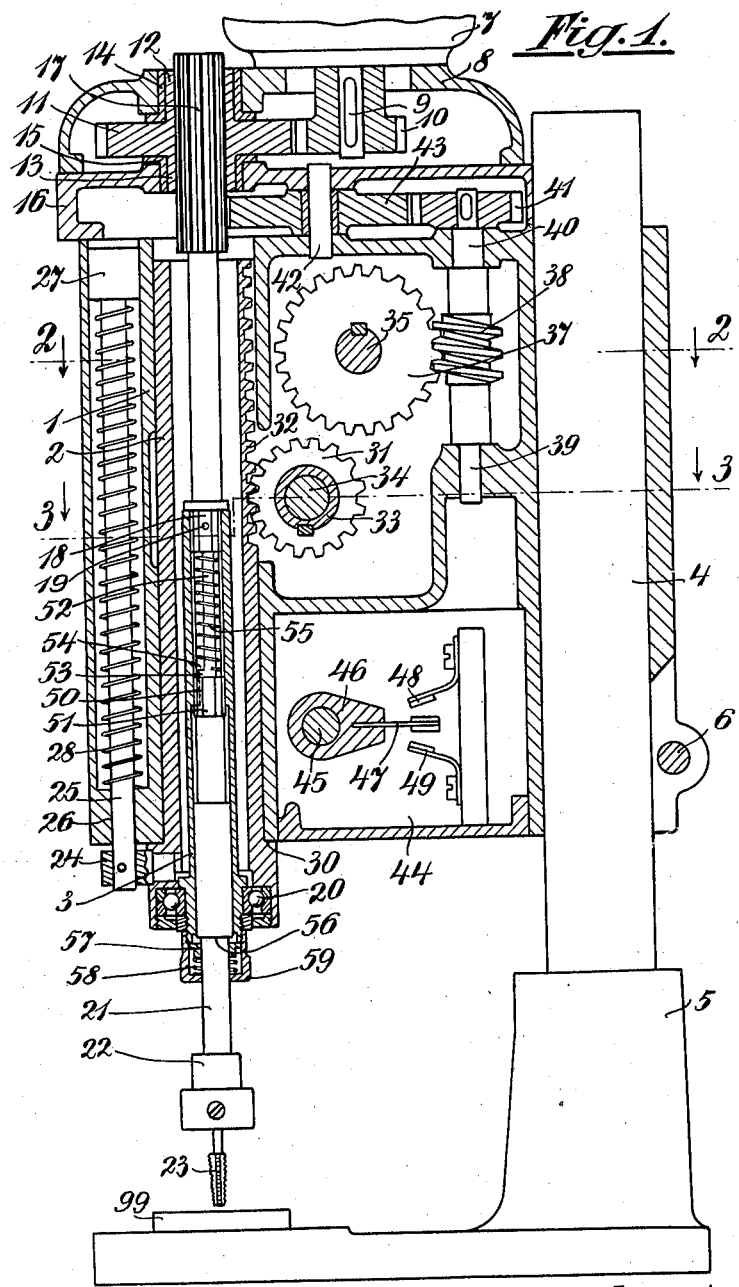

Referring to the drawings and first to Figs. 1–17, 1 is a casing, in the front portion of which is guided the bushing 2 for the feed spindle 3. With its back portion the casing 1 is adjustably secured by means of the set screw 6 to the supporting column 4 of the standard 5. The feed spindle is caused to rotate alternately in one and the other direction by a reversible electro-motor partly shown at 7, which is connected to the upper cover 8 of the casing 1. On the end 9 of the shaft of the motor 7 rests the driver 10 engaging the toothed wheel 11 which is supported with its hollow journals 12 and 13 in the bearing 14 of the upper cover 8 and in the bearing 15 of the intermediate cover 16, respectively. The toothed driving end 17 of the feed spindle 3 passes through the similarly toothed boring of the internally toothed wheel 11, arranged to be driven by the same, but free for longitudinal motion. The driving end 17 is connected with the hollow feed spindle 3 by a slot and key device 18 and is secured against axial displacement by the transverse pin 19. The lower end of the hollow spindle 3 is supported in a bearing 20 capable of taking up longitudinal and transversal pressure and situated in the reinforced bottom end of the bushing 2. In the boring of the hollow spindle 3 is guided free for longitudinal motion the chuck-spindle 21 accommodating at its outer end a chuck 22 engaging the screw tap 23; the chuck-spindle is secured against rotation relative to the hollow spindle in a manner which will be explained further below.

A transverse arm 24 connects the bushing 2 with a tension rod 25 guided in a boring 26 of the casing 1. A return spring 28 arranged underneath the head 27 of the tension rod 25 tends to draw the bushing 2 upwardly until the check 30 touches the casing 1 from below.

Figure 2:
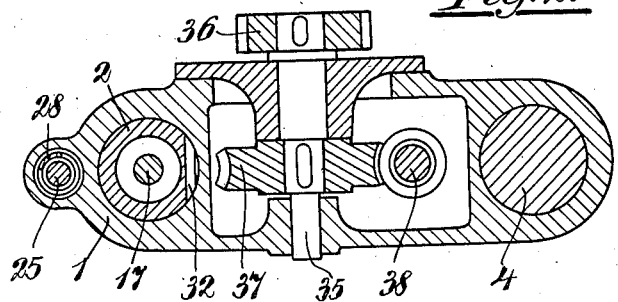
Figure 3:
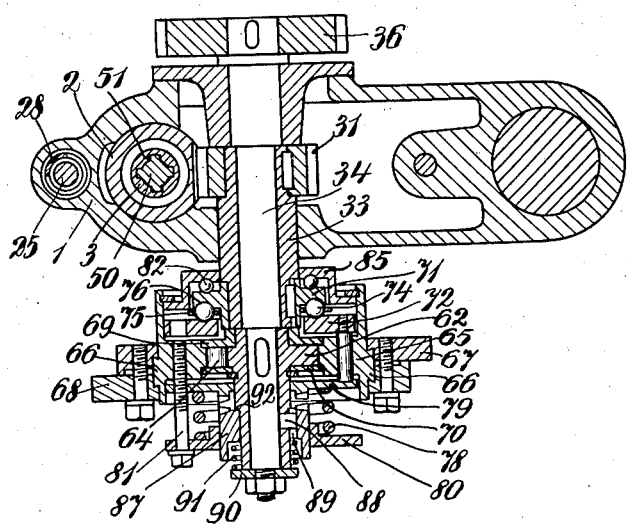
Fig. 3 is a similar cross section on the line 3—3 in Fig. 1.

The feed of the bushing 2 is effected by the pinion 31 engaging the rack 32 attached to the bushing (Figs. 1, 3 and 12). The pinion 31 is mounted on the hollow shaft 33 which is traversed by the driving shaft 34 and joined to the same by means of a coupling in a manner which will be explained further below. The shaft 34 is driven from the worm wheel shaft 35 by means of exchangeably mounted change wheels 36 (Figs. 1 and 2). On the worm wheel shaft 35 is secured the worm wheel 37 engaging the worm 38, the shaft of which is supported in bearings 39 and 40 in the casing 1. To the upper end of the worm shaft 38 is rigidly fixed the toothed wheel 41 which is driven from the toothed part of the driving end 17 of the hollow feed spindle 3 by means of the intermediate wheel 43 which turns on the bolt 42 secured in the casing 1. By exchanging the change wheels 36 the feed may be adjusted as desired.

In the lower part of the casing 1 is arranged a change-over switch 44, the shaft 45 of which is turned in the usual manner, as by the mechanism shown in my Patent No. 1,991,927 granted February 19, 1935, for example alternately to the right and to the left by the rotation of the shaft 34, whereby the contact tongues 47 connected with the switching shaft by the insulating piece 46 are brought alternately in contact with the contacts 48 and 49 respectively and connect the driving motor 7 for rotation to the right, rotation to the left and stoppage, respectively.

On the head 50 of the chuck-spindle 21, which is guided in the hollow spindle 3 for longitudinal motion, projections 51 are provided which engage grooves 52 formed in the hollow spindle 3. The grooves 52 are enlarged on one side to form shoulders or stops 54. Between the lower end of the driving shaft 17 and the chuck-spindle 21 is arranged a return spring 55 tending to press the chuck-spindle downwardly until it rests on the stop ring 57 with the shoulder 56. The stop ring 57 is forced upwardly against the lower end of the hollow spindle 3 by the spring 58 with a force which sufficiently exceeds the weight of the chuck-spindle 21 and the tension of the spring 55; the spring 58 is supported by the bottom of the cap 59 screwed on the lower end of the hollow spindle 3. The stop ring 57 is provided with a collar 60 to form a flanged tube capable of limiting the position of rest of the chuck-spindle 21 at two different levels according as it is mounted in the cap 59 with the collar 60 turned downwardly (as shown in Fig. 4) or upwardly (as shown in Fig. 11). The lower end of the hollow spindle 3 is provided with an enlargement 61 to receive the collar 60 in the case where this collar is turned upwardly.

The operation of the machine described above is illustrated by the drawings 4–11.

If the stop ring 57 assumes the position shown in Fig. 4, the chuck-spindle 21 is positioned at so low a level that the upper edges of the projections 51 are spaced in the position of rest, below the shoulders 54 by the amount L shown in Fig. 8. As soon as the screw tap 23 meets the work-piece 99 and starts cutting, the resistance exerted thereby causes the projections to assume the positions shown in Figs. 6 and 9, wherein the hollow spindle 3 carries the chuck-spindle 21 along to move forward and in longitudinal direction. As soon as the direction of rotation of the hollow spindle 3 is reversed in its lowermost position, the projections 51 slide off the shoulders 54 and are now allowed to enter the grooves 52 (Fig. 10); the chuck-spindle 21 and the screw tap 23 are thus relieved of any axial pressure during the return motion which now follows, so that the screw tap 23 cannot spoil the thread already cut when leaving it.

In this adjustment of the machine the chuck-spindle 21 is allowed to yield upwardly by the amount L against the action of the light return spring 55 and also to yield downwardly against the action of the spring 58. It is thus possible to cut threads with a set of screw taps one after the other.

In the case where a particularly small and sensitive thread has to be cut, the adjustment shown in Fig. 11 may be applied. The upturned collar 60 of the stop ring 57 lifts the chuck-spindle 21 so that the projections are situated from the outset above the shoulders 54 in the straight grooves 52. The chuck-spindle 21 is enabled to yield upwardly against the action of the return spring 55, the tension of which is adjusted in this case to the pressure required at the beginning of the cutting action; to this end the spring 55 is arranged for ready exchange after the cap 59 has been screwed off and the chuck-spindle 21 withdrawn.

In another modification the collar may be chosen so high that the projections 51 are situated close to and below the shoulders 54, if for some reasons the clearance L should be very small, but the chuck-spindle is required to be relieved of pressure during the return motion. This is the case for instance in cutting blind threads.

In such a case the pinion 31 is coupled with the shaft 34 by means of a free wheel coupling of the usual kind which will drive the pinion 31 only during the feed motion, while the return motion is effected by the return spring 28. In this manner the driving motor 7 is prevented from further driving the feed gear after the hollow spindle 3 has returned into its upper end position limited by the stop 30; a separate friction clutch coupling, which will not always operate with sufficient safety, may thus be dispensed with.

This free wheel coupling (Figs. 3, 12 and 16) comprises a hub 62 rigidly secured to the shaft 34; in the spiral bottom parts of the slots 63 of this hub are arranged rollers 64 driving, during the feed motion, the drum 65 provided with an outer dovetail rim 66, on which adjustable catches 67 and 68 may be clamped for governing the change-over switch 44 or some other reversing device for reversal after a feed or return motion has come to an end. During the return motion the drum 65 is guided between the discs 69 and 70. The rotation of the drum 65 is transmitted to the hollow shaft 33 by an overload coupling comprising the notched disc 71, which is rigidly secured to the hollow shaft 33, and a second notched disc 72, which is driven by the drum 65 with the aid of drivers 73. Between the notched discs 71 and 72 are arranged two balls 74 which are guided by cage 75 and (when at rest) are located in the notches 76, but, when the coupling is disengaged, in the shallow annular grooves 77 (Figs. 13, 14 and 15).

The driving capacity of the overload coupling is limited by the pressure spring 78 arranged between the pressure disc 79 and the spring plate 80, the tension of which spring can be adjusted by means of the screw 81. The counter-pressure of the pressure spring 78 is taken up almost without any friction by the row of balls 82 arranged in the groove 83 of the notched disc 71 and the groove 84 of the ball-race 85, which latter is joined to the drum 65 by the split ring 86.

The overload coupling serves for disengaging the pinion 31 from the shaft 34 in the cases where the screw tap 23 meets a work-piece 99 without a hole or a point besides the hole in which the thread is to be cut, and where the adjustment of the machine, as shown in Figs. 4, 8 and 9, prevents the chuck-spindle 21 from lagging behind the feed. When such a case occurs, the hollow shaft 33 with the pinion 31 is disengaged from the shaft 34, whereafter the bushing 2 is at once withdrawn into the starting position by the return spring 28. In order to enable the catches 67 and 68 to act also in this case for reversal of the direction of rotation of the feed spindle to return motion, an auxiliary coupling 87 is provided which is readily movable in axial direction, but is secured by a pin 88 and groove 89 against circumferential displacement and is attached to the hub 62 and pressed, when at rest, against the shoulder 92 by the spring 91 which is supported at the back by the disc 90. When the ratchet coupling 71, 72 and 74 starts operating the pressure disc 79 moves, as seen in Fig. 17, to the right so far that its oblique clutch teeth 93 come to engage the teeth 94 of the auxiliary coupling 87 which now drives the drum 65 until the catch 67 has reversed the direction of rotation of the feed spindle for return motion, whereafter the shaft 34 returns to its starting position, the balls 74 again entering the notches 76; the machine is now ready to operate again during the next stroke in the normal manner.

Figs. 18–20 show a simpler embodiment of my invention, which is particularly adapted for smaller sized machines to be used in cases where only moderate pressures occur in the axial direction when cutting a thread.

Referring to Figs. 18–20, 100 is the hollow feed spindle. The grooves 52 with the enlargements 53 forming the shoulders 54 are formed and act in the same manner as described above in regard to Figs. 6–10, but they are arranged in a particular sleeve 95 sliding for free longitudinal motion in the smooth boring of the hollow spindle 100. The toothed portion 102 of the driving part 101 is extended downwardly and causes the sleeve 95 to rotate with it and therefore with the feed spindle, but allows the sleeve 95 to slide in longitudinal direction. The pressure spring 96, the initial tension of which considerably exceeds the pressure occurring in the very beginning of the cutting of threads, forces the sleeve 95 upwardly against the inner shoulder 97 of the spindle 100 and in the normal course of the operation stroke holds it in this position. However, in the case mentioned above where the point of the screw tap 23 meets a work-piece 99 without a hole or the spindle is prevented for some other reason from carrying out the feed movement, the sleeve 95 and the chuck-spindle 21 together with it are displaced against the action of the safety pressure spring 96 by the remaining distance of feed into the hollow spindle 100 which is thereby enabled to move forwardly through the further part of the feed until the change-over switch 44 connects the driving motor 7 for return-movement. In this way there is no necessity of arranging a separate overload coupling in the feed device; the drum 65 may be rigidly secured in the simplest manner, for instance by means of a clutch coupling 98, to the pinion 31 or to its hollow shaft 33.

I wish it to be understood that I do not desire to be limited to the exact details of construction shown and described for obvious modifications will occur to a person skilled in the art.

I claim:—

1. A screw cutting machine comprising in combination, a frame, a casing on said frame, a bushing guided in said casing for longitudinal feed and return motion, a feed-spindle guided for reversible rotation relatively to, and for feed and return motion in conformity to, said bushing, means arranged to reverse both the direction of the longitudinal motion of said bushing and the direction of the rotation of said feed-spindle at two positions of their stroke, a chuck-spindle adapted to accommodate a chuck for a screw tap and guided by said feed-spindle to rotate in conformity to the same and free for longitudinal motion relative to said feed-spindle, stop-means adapted to limit this latter longitudinal motion and disengageably arranged to transmit to said chuck-spindle the feed motion of said feed-spindle in the direction towards the screw tap chuck, and means adapted to positively feed in this direction said bushing with said feed-spindle while said spindle rotates in one of the two directions.

2. A screw cutting machine comprising in combination, a frame, a casing on said frame, a bushing guided in said casing for longitudinal feed and return motion, a feed-spindle guided for reversible rotation relatively to, and for feed and return motion in conformity to, said bushing, means arranged to reverse both the direction of the longitudinal motion of said bushing and the direction of the rotation of said feed-spindle at two positions of their stroke, a chuck-spindle adapted to accommodate a chuck for a screw tap and guided by said feed-spindle to rotate in conformity to the same and free for longitudinal motion relative to said feed-spindle, stop-means adapted to limit this latter longitudinal motion and disengageably arranged to transmit to said chuck-spindle the feed motion of said feed-spindle in the direction towards the screw tap chuck, means adapted to positively feed in this direction said bushing with said feed-spindle while said spindle rotates in one of the two directions, resilient means arranged to disengage the last mentioned feeding means when the resistance exerted on the screw tap exceeds a given limit, and resilient means arranged to move back said bushing.

3. Screw cutting machine comprising in combination, a frame, a casing on said frame, a bushing guided in said casing for longitudinal feed and return motion, a hollow spindle guided for reversible rotation in, and for feed and return motion in conformity to, said bushing, means arranged to reverse both the direction of longitudinal motion of said bushing and the direction of rotation of said hollow spindle at two positions of their stroke, a chuck-spindle adapted to accommodate a chuck for a screw tap on its one end and provided with a longitudinal projection near its other end, a longitudinal groove in the inner wall of said hollow spindle arranged to receive said projection for longitudinal motion, an enlargement on one side of said groove, a shoulder in said groove formed by said enlargement and arranged to sustain the back end of said projection while the screw tap works and to subsequently slide off said projection, resilient means tending to lead said projection into said enlargement, means adapted to feed said bushing towards the screw tap chuck while the hollow spindle rotates in one of the two directions, and means for moving back said bushing.

4. In the screw cutting machine of claim 3, a stop adapted to resiliently limit the longitudinal motion of said chuck-spindle relative to said hollow spindle in the direction towards the screw tap chuck.

5. In the screw cutting machine of claim 3, a reversibly arranged and yieldably supported stop to resiliently limit the longitudinal motion of said chuck-spindle relative to said hollow spindle in the direction of the screw tap chuck, said stop comprising a flanged tube, said hollow spindle being formed with an inner enlargement adapted to receive the tubular part of said stop.

6. Screw cutting machine comprising in combination, a frame, a casing on said frame, a bushing guided in said casing for longitudinal feed and return motion, a hollow spindle guided for reversible rotation in, and for feed and return motion in conformity to, said bushing, means arranged to reverse both the direction of longitudinal motion of said bushing and the direction of rotation of said hollow spindle at two positions of their stroke, a chuck-spindle adapted to accommodate a chuck for a screw tap on its one end and provided with a longitudinal projection near its other end, a longitudinal groove in the inner wall of said hollow spindle arranged to receive said projection for longitudinal motion, an enlargement on one side of said groove, a shoulder in said groove formed by said enlargement and arranged to sustain the back end of said projection while the screw tap works and to subsequently slide off said projection, resilient means tending to lead said projection into said enlargement, a rack connected with said bushing, a pinion engaging said rack, a driving shaft arranged to carry said pinion, a coupling adapted to connect, while said bushing moves in the direction towards said screw tap chuck, said pinion with said shaft, when the power needed for driving said pinion on said shaft is smaller than a given limit, and means adapted to move back said bushing.

7. Screw cutting machine comprising in combination, a frame, a casing on said frame, a bushing guided in said casing for longitudinal feed and return motion, a hollow spindle guided for reversible rotation in, and for feed and return motion in conformity to, said bushing, means arranged to reverse both the direction of longitudinal motion of said bushing and the direction of rotation of said hollow spindle at two positions of their stroke, said means being adapted to be released by a catch, a catch, a chuck-spindle adapted to accommodate a chuck for a screw tap on its one end and provided with a longitudinal projection near its other end, a longitudinal groove in the inner wall of said hollow spindle arranged to receive said projection for longitudinal motion, an enlargement on one side of said groove, a shoulder in said groove formed by said enlargement and arranged to sustain the back end of said projection while the screw tap works and to subsequently slide off said projection, resilient means tending to lead said projection into said enlargement, a rack connected with said bushing, a pinion engaging said rack, a driving shaft arranged to carry said pinion and said catch, a ratchet coupling and adjustable spring means for actuating same, said coupling being arranged to connect, while said bushing moves in direction to said screw tap chuck, said pinion and said catch with said shaft, when the power needed for driving said pinion on said shaft is smaller than a given limit, means adapted to couple said catch with said shaft, when said pinion and shaft are disconnected, gear means arranged to drive said shaft in correspondence to said hollow spindle, and means adapted to move back said bushing.

8. The screw cutting machine of claim 6, in which means are arranged for uncoupling said pinion from said shaft for independent rotation on the same while said bushing moves backward, spring means being provided for moving back said bushing.

9. The screw cutting machine of claim 7, in which means are arranged for uncoupling said pinion from said shaft for independent rotation on the same while said bushing moves backward, spring means being provided for moving back said bushing.

10. Screw cutting machine comprising in combination, a frame, a casing on said frame, a bushing guided in said casing for longitudinal feed and return motion, a hollow spindle guided for reversible rotation in, and for feed and return motion in conformity to, said bushing, means arranged to reverse both the direction of longitudinal motion of said bushing and the direction of rotation of said hollow spindle at two positions of their stroke, a sleeve guided for longitudinal motion in, and for rotation in conformity to, said hollow spindle, a chuck-spindle adapted to accommodate a chuck for a screw tap on its one end and provided with a longitudinal projection near its other end, a longitudinal groove in the inner wall of said sleeve, arranged to receive said projection for longitudinal motion, an enlargement on one side of said groove, a shoulder in said groove formed by said enlargement and arranged to sustain the back end of said projection while the screw tap works and to subsequently slide off said projection, resilient means tending to lead said projection into said enlargement, a stop arranged to limit the longitudinal motion of said sleeve in said hollow spindle towards said screw tap chuck, resilient means arranged to press said sleeve against said stop with a power exceeding the highest counter-pressure occurring in a desired cutting action, means adapted to feed said bushing towards the screw tap chuck while the hollow spindle rotates in one of the two directions, and means for moving back said bushing.

11. Screw cutting machine comprising in combination, a frame, a casing on said frame, a bushing guided in said casing for longitudinal feed and return motion, a hollow spindle guided for reversible rotation in, and for feed and return motion in conformity to, said bushing, means arranged to reverse both the direction of longitudinal motion of said bushing and the direction of rotation of said hollow spindle at two positions of their stroke, a sleeve guided for longitudinal motion in, and for rotation in conformity to, said hollow spindle, a chuck-spindle adapted to accommodate a chuck for a screw tap on its one end and provided with a longitudinal projection near its other end, a longitudinal groove in the inner wall of said sleeve arranged to receive said projection for longitudinal motion, an enlargement on one side of said groove, a shoulder in said groove formed by said enlargement and arranged to sustain the back end of said projection while the screw tap works and to subsequently slide off said projection, resilient means tending to lead said projection into said enlargement, a stop arranged to limit the longitudinal motion of said sleeve in said hollow spindle towards said screw tap chuck, resilient means arranged to press said sleeve against said stop with a power exceeding the highest counter-pressure occurring in a desired cutting action, a rack connected with said bushing, a pinion engaging said rack, a driving shaft arranged to carry said pinion, a coupling adapted to connect, while said bushing moves in the direction towards said screw tap chuck, said pinion with said shaft, means arranged for uncoupling said pinion from said shaft for independent rotation on the same while said bushing moves backward, and spring means tending to move back said bushing.

RICHARD HERRMANN.